United States Patent
Lents et al.

(10) Patent No.: US 6,928,832 B2
(45) Date of Patent: Aug. 16, 2005

(54) ELECTRICALLY DRIVEN AIRCRAFT CABIN VENTILATION AND ENVIRONMENTAL CONTROL SYSTEM

(75) Inventors: Charles E. Lents, Rockford, IL (US); Steven E. Squier, Rockford, IL (US); Wayne A. Thresher, Springfield, MA (US)

(73) Assignee: Hamilton Sunstrand Corporation, Windsor Locks, CT (US)

( * ) Notice: Subject to any disclaimer, the term of this patent is extended or adjusted under 35 U.S.C. 154(b) by 0 days.

(21) Appl. No.: 10/672,651

(22) Filed: Sep. 26, 2003

(65) Prior Publication Data

US 2004/0060317 A1 Apr. 1, 2004

Related U.S. Application Data

(63) Continuation of application No. 10/076,687, filed on Feb. 14, 2002, now Pat. No. 6,681,592.
(60) Provisional application No. 60/269,495, filed on Feb. 16, 2001.

(51) Int. Cl.$^7$ ............................................... F25D 9/00
(52) U.S. Cl. ........................................... 62/401; 62/402
(58) Field of Search ........................... 62/401, 402, 87, 62/86

(56) References Cited

U.S. PATENT DOCUMENTS

| | | | | |
|---|---|---|---|---|
| 4,198,830 A | * | 4/1980 | Campbell | ............ 62/87 |
| 4,419,926 A | * | 12/1983 | Cronin et al. | ............ 454/74 |
| 4,869,071 A | | 9/1989 | Wehner et al. | |
| 5,214,935 A | * | 6/1993 | Brunskill | ............ 62/402 |
| 5,299,763 A | | 4/1994 | Bescoby et al. | |
| 5,709,103 A | * | 1/1998 | Williams | ............ 62/402 |
| 5,813,630 A | | 9/1998 | Williams | |
| 5,887,445 A | * | 3/1999 | Murry et al. | ............ 62/402 |
| 5,899,085 A | | 5/1999 | Williams | |
| 5,911,388 A | | 6/1999 | Severson et al. | |
| 5,956,960 A | | 9/1999 | Niggeman | |
| 5,967,461 A | | 10/1999 | Farrington | |
| 6,058,715 A | | 5/2000 | Strang et al. | |
| 6,199,387 B1 | | 3/2001 | Sauterleute | |
| 6,257,003 B1 | * | 7/2001 | Hipsky | ............ 62/88 |
| 6,295,822 B1 | | 10/2001 | Mueller | |
| 6,381,969 B1 | * | 5/2002 | Afeiche et al. | ............ 62/87 |
| 6,681,592 B1 | * | 1/2004 | Lents et al. | ............ 62/401 |

* cited by examiner

Primary Examiner—William C. Doerrler
(74) Attorney, Agent, or Firm—Bachman & LaPointe, P.C.

(57) ABSTRACT

The present invention relates to an electrically driven aircraft cabin and ventilation and environmental control system. The system includes at least one inlet for capturing ram air, an electrically driven compressor for pressurizing the ram air, and a thermal conditioning subsystem for thermally conditioning the pressurized ram air. The system further includes a subsystem for removing undesirable moisture from the thermally conditioned ram air.

26 Claims, 5 Drawing Sheets

US 6,928,832 B2

ELECTRICALLY DRIVEN AIRCRAFT CABIN VENTILATION AND ENVIRONMENTAL CONTROL SYSTEM

CROSS REFERENCE TO RELATED APPLICATION(S)

This application is a continuation application of U.S. patent application Ser. No. 10/076,687, filed Feb. 14, 2002, now U.S. Pat. No. 6,681,592 entitled Electrically Driven Aircraft Cabin Ventilation and Environmental Control System, which claims the benefit of U.S. Provisional Patent Application No. 60/269,495, filed Feb. 16, 2001, entitled Electrically Driven Aircraft Cabin Ventilation and Environmental Control System.

BACKGROUND OF THE INVENTION

The present invention relates to an electrically driven aircraft cabin and ventilation and environmental control system.

Many of today's aircraft use the extraction of thrust engine compressor bleed air to power the aircraft cabin and cargo ventilation system and environmental control system (ECS). The extraction of engine cycle compressor core bleed air places a significant penalty on the engine cycle, reducing engine efficiency. Much of the power inherent in the extracted bleed air is purposely wasted in the bleed air control and distribution system to ensure that the hot bleed air conforms to aircraft material limits, before it is delivered to the ECS. In addition, the bleed air extraction and distribution equipment required to use engine bleed is expensive to purchase and install, and relatively unreliable.

Modern aircraft ventilation systems fail to use the energy contained in cabin exhaust air efficiently. Conventionally, this air is continually dumped overboard. At high altitudes, this exhaust air has useable energy based on the pressure differential with ambient and enthalpy content. At lower altitudes, where the air pressure differential is not significant, this air may be a relatively cool heat sink.

SUMMARY OF THE INVENTION

Accordingly, it is a principal object of the present invention to provide a system wherein aircraft onboard electric power is used to run the cabin pressurization and ventilation system, and the environmental control system.

The foregoing object is attained by the electrically driven aircraft cabin ventilation and environmental control system of the present invention.

In accordance with the present invention, an electrically driven aircraft cabin ventilation and environmental control system comprises means for capturing ram air, electrically driven means for pressurizing the ram air, and means for thermally conditioning the pressurized ram air. The means for thermally conditioning the pressurized ram air may utilize additional ram air and/or cabin exhaust air to carry out the thermal conditioning. The system further has a means for removing undesirable moisture from the conditioned stream.

A method for delivering conditioned air to an aircraft cabin broadly comprises the steps of capturing ram air, pressurizing at least a portion of the ram air with an electrically driven compressor, thermally conditioning the pressurized ram air, and delivering the thermally conditioned ram air to the aircraft cabin.

By employing electric power as the power source for the aircraft cabin ventilation and environmental control system rather than bleed air, the present invention contributes to the elimination of engine bleed equipment, as well as eliminating all the hot air, high pressure valves and ducting of the pneumatic distribution system from the engine bleed system to the ECS.

Other details of the electrically driven aircraft cabin ventilation and environmental control system of the present invention, as well as other objects and advantages attendant thereto, are set forth in the following detailed description and the accompanying drawings wherein like reference numerals depict like elements.

DETAILED DESCRIPTION OF THE PREFERRED EMBODIMENT(S)

Figure 1:
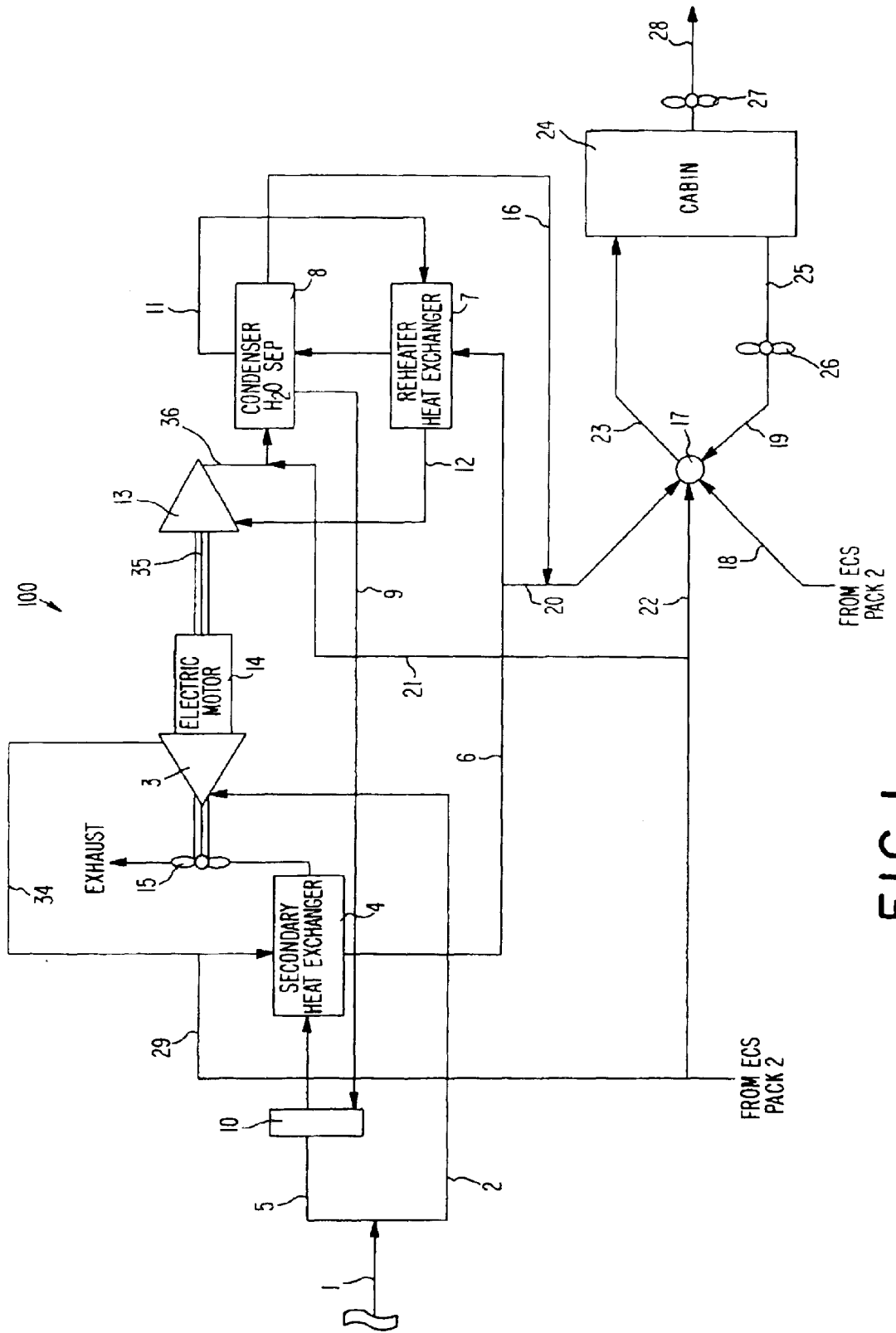
FIG. 1 is a schematic representation of a first embodiment of an electrically driven aircraft cabin ventilation and environmental control system in accordance with the present invention.

Referring now to the drawings, FIG. 1 illustrates a first embodiment of an electrically driven aircraft cabin ventilation and environmental control system 100. In this system, ram air is brought into the system 100 through ram inlet 1. The inlet 1 may be located in any suitable position on an aircraft. A portion of the ram air is diverted into conduit 2 for delivery to ventilation compressor 3 where it is compressed. The compressor 3 puts into the ram air the energy required for both cabin pressurization and pneumatically driven air conditioning, depending upon environmental and flight conditions. Some of the heat of compression is removed from the ventilation compressor exit stream 34 in a secondary heat exchanger 4. The heat sink for the heat exchanger 4 is ram air obtained from the ram inlet 1 that is not delivered to the compressor 3 and is instead diverted into the conduit 5. On the ground, a ram air fan 15, connected to the ECS turbomachine shaft 35, provides the energy necessary to draw air through the system. The heat sink ram air delivered to the heat exchanger 4 is precooled by the injection and evaporation of liquid water in the spray cooler 10. A portion of the hot compressed ventilation air stream is removed upstream of the heat exchanger 4 through line 29 to provide temperature modulation in the air cycle subsystem and air distribution system.

The cooled pressurized air is delivered to a conventional high pressure water separator air cycle subsystem via line 6. The air is additionally cooled in a reheater heat exchanger 7 and then further cooled in a condenser heat exchanger 8, where water vapor contained in the air is condensed to liquid and separated from the cold air through stream 9. This stream of liquid water is delivered to the spray cooler 10, where it is injected into the incoming ram air stream to precool the heat sink for the secondary heat exchanger 4. The cold dry pressurized air leaving the condenser 8 is delivered to the opposite side of the reheater 7 through line 11 where it is warmed in the reheater 7 as it cools the incoming air stream from the secondary heat exchanger 4. The warm, dry air is delivered through line 12 to the inlet of cooling turbine 13. Expansion of the cool pressurized dry air across the cooling turbine 13 reduces the pressure and temperature of the air. To control and moderate the outlet temperature of the cooling turbine air, hot bypass air 21 from another ECS pack aboard the aircraft is mixed downstream of the exit 36 of the turbine 13. Work done by expansion in the cooling turbine 13 is used along with primary power supplied by an electric motor 14 to drive the ventilator compressor 3 and ram air fan 15, which are on the same shaft as the electric motor 14 and the cooling turbine 13.

Cool dry air exiting from the condenser 8 is delivered through line 16 to the cabin air distribution system mix manifold 17. In the mix manifold 17, the cooled dry air is combined with similar cool conditioned air from other operating air cycle system packs via line 18, and with cabin recirculated air via line 19. During conditions when operation of the air cycle cooling system is not required to provide cold air, the pressurized air stream 6 from the secondary heat exchanger 4 is bypassed through line 20 directly to the mix manifold 17. The air in the mix manifold 17 is further conditioned by the addition of hot bypass air 22 as necessary to provide the desired cabin supply air temperature. The conditioned cabin supply air is then delivered through line 23 to the cabin 24. A portion of the cabin exhaust air 25 is recirculated back to the mix manifold 17 with motion flow power provided by the recirculating fan 26. The remainder of the cabin exhaust air is exhausted to ambient through exhaust fan 27 and overboard line 28.

Figure 2:
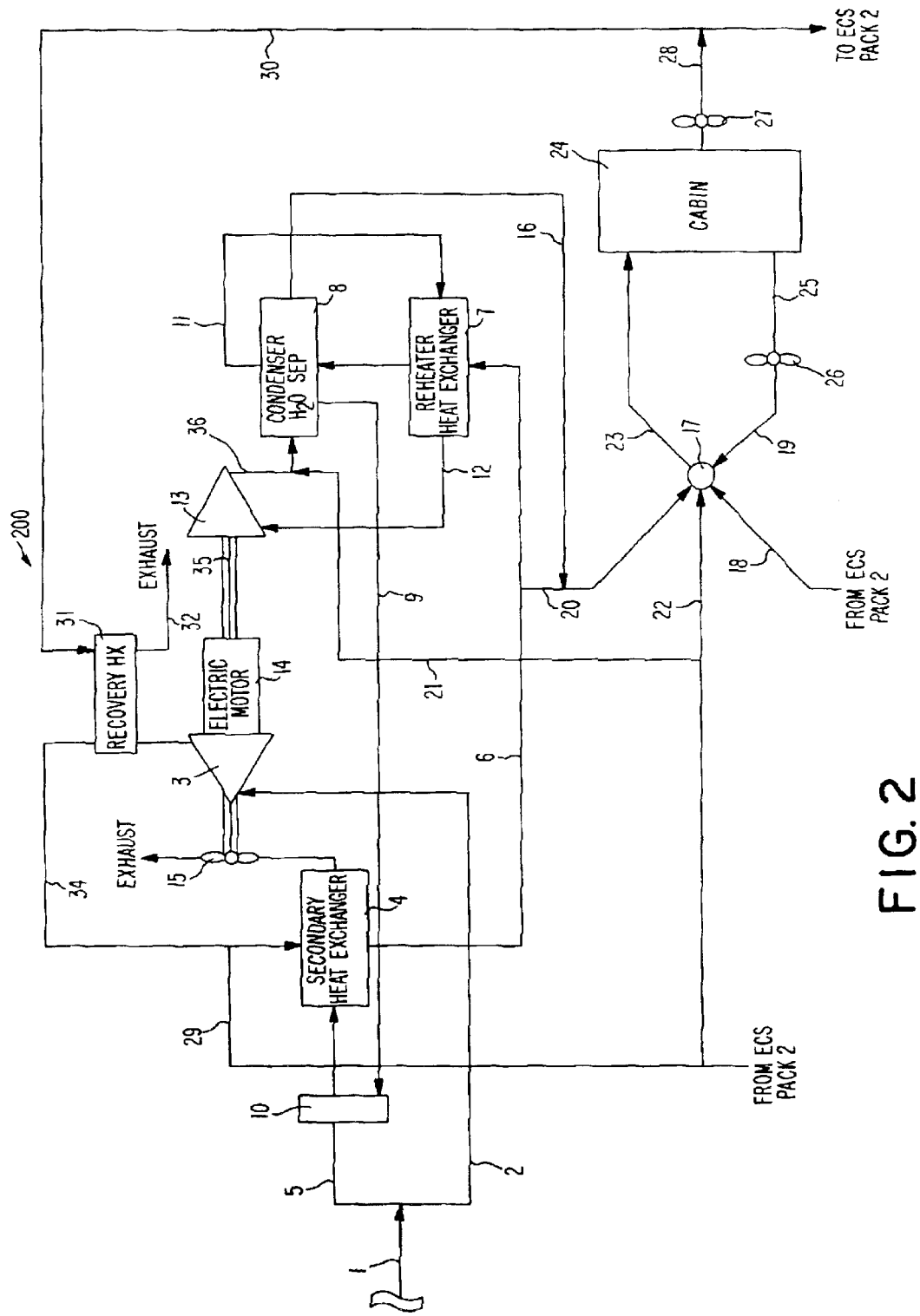
FIG. 2 is a schematic representation of a second embodiment of an electrically driven aircraft cabin ventilation and environmental control system in accordance with the present invention.

Referring now to FIG. 2, a second embodiment of an electrically driven aircraft cabin ventilation and environmental control system 200 is illustrated. As can be seen from this figure, system 200 retains the architecture of the system 100. In this embodiment however, instead of exhausting the non-recirculated cabin air flow overboard, this air is delivered through line 30 to recovery heat exchanger 31, where the cooler cabin air provides a heat sink for the hot ventilation compressor exit air, effectively precooling it prior to its delivery to the secondary heat exchanger 4. The cabin air is then exhausted overboard through line 32. The use of this cool cabin air offloads the cooling load of the secondary heat exchanger 4, and therefore reduces the amount of ram air required, and its extraction penalty, to precool the air cycle system delivery air. This potentially results in a decrease in total heat exchanger weight and aircraft drag.

Figure 3:
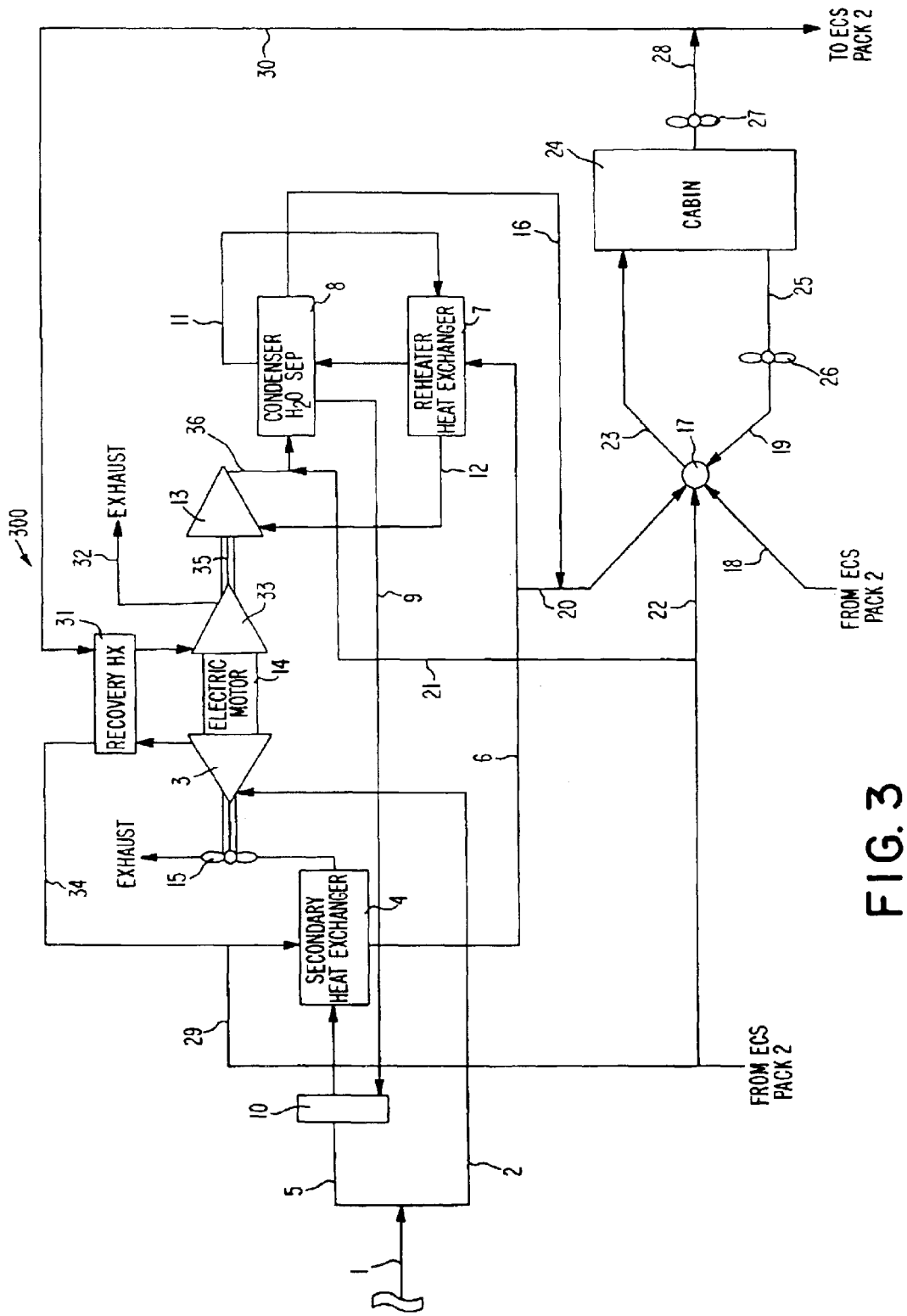
FIG. 3 is a schematic representation of a third embodiment of an electrically driven aircraft cabin ventilation and environmental control system in accordance with the present invention.

FIG. 3 illustrates a third embodiment of an electrically driven aircraft cabin ventilation and environmental control system 300 in accordance with the present invention. This embodiment employs the basic architecture of the system 100 and the modifications of system 200. In this system however, after the cabin exhaust air has been used as a heat sink for the ventilation compressor exit air, the cabin air stream is expanded across a power turbine 33. This is done to extract additional energy from the stream as a result of the differential between the cabin pressure and the ambient pressure and the enthalpy content of the stream. Power turbine 33 is preferably attached to the same shaft as the ventilation compressor 3 and the cooling turbine 13, and its work is delivered to the compressor 3 as shaft power to offset the electrical power required at the motor 14.

A variation of the system of FIG. 3 involves using a single turbine instead of two, essentially integrating the functions of both the cooling turbine 13 and the power turbine 33. This single turbine would perform the cooling turbine function for most of the flight, but at altitude, where the cooling turbine function is not necessary, it would be used for energy recovery of cabin exhaust air. Only one of these functions would be performed under any given conditions, with the cooling function having priority over the energy recovery function. Thereby, through appropriate mode switching based on current environmental conditions, the single turbine could perform either function as desired.

Figure 4:
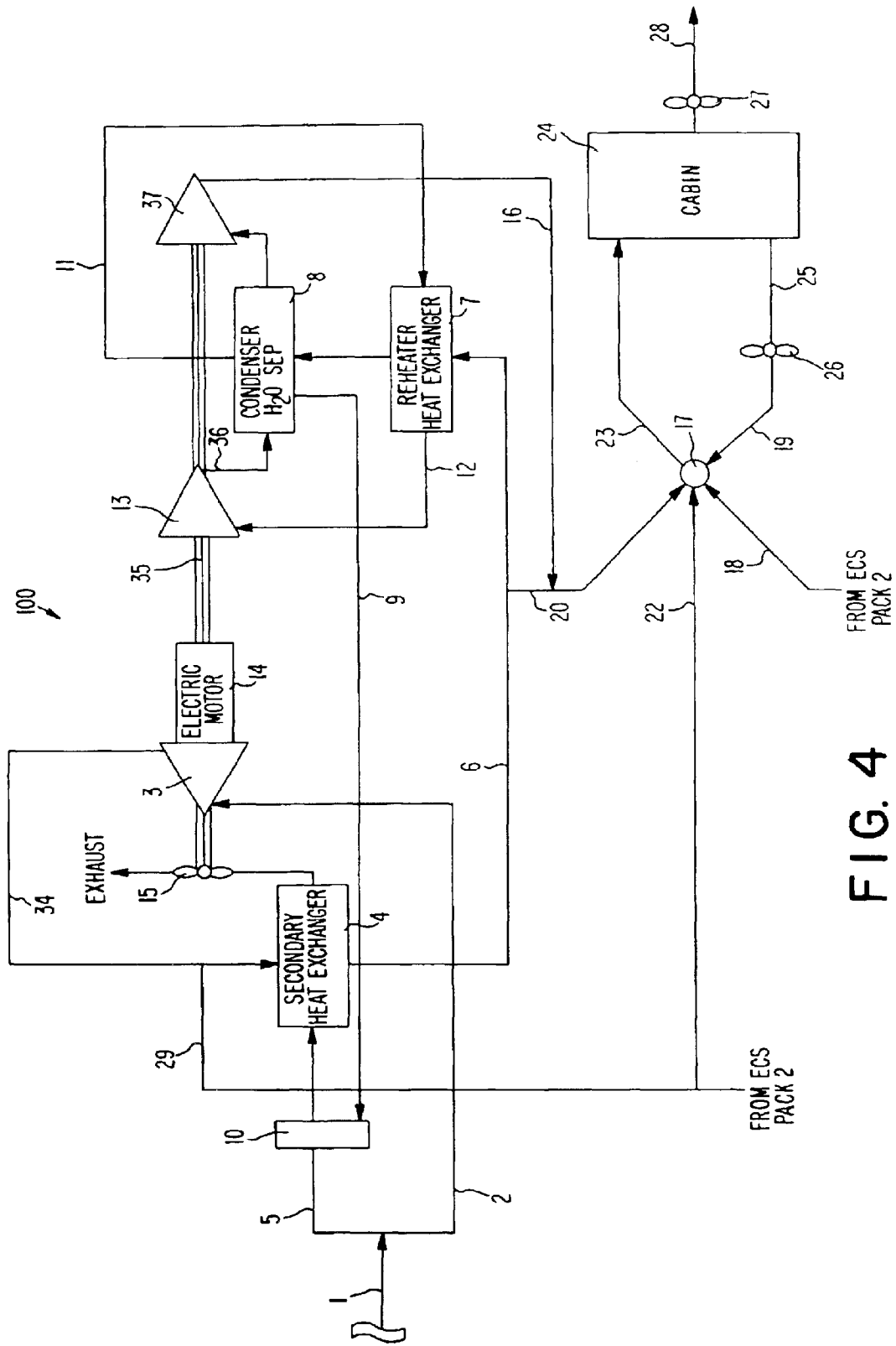
FIG. 4 is a schematic representation of a fourth embodiment of an electrically driven aircraft cabin ventilation and environmental control system in accordance with the present invention.

FIG. 4 illustrates yet another embodiment of an electrically driven aircraft cabin ventilation and environmental control system in accordance with the present invention. In this embodiment, the single cooling turbine/high pressure water separator based air cycle subsystem loop is replaced with a condensing air cycle subsystem. In this embodiment, the cool dehumidified air leaving the condenser 8 at intermediate pressure enters the condensing turbine 37, where through further expansion the air is cooled and exits close to the desired cabin pressure level. This embodiment eliminates the need for hot air bypass tempering of the stream exiting the cooling turbine 13, as the conditions exiting the cooling turbine 13 are moderated by the controlled partial expansion of the air stream to give the desired temperature at the inlet of the condenser 8.

Figure 5:
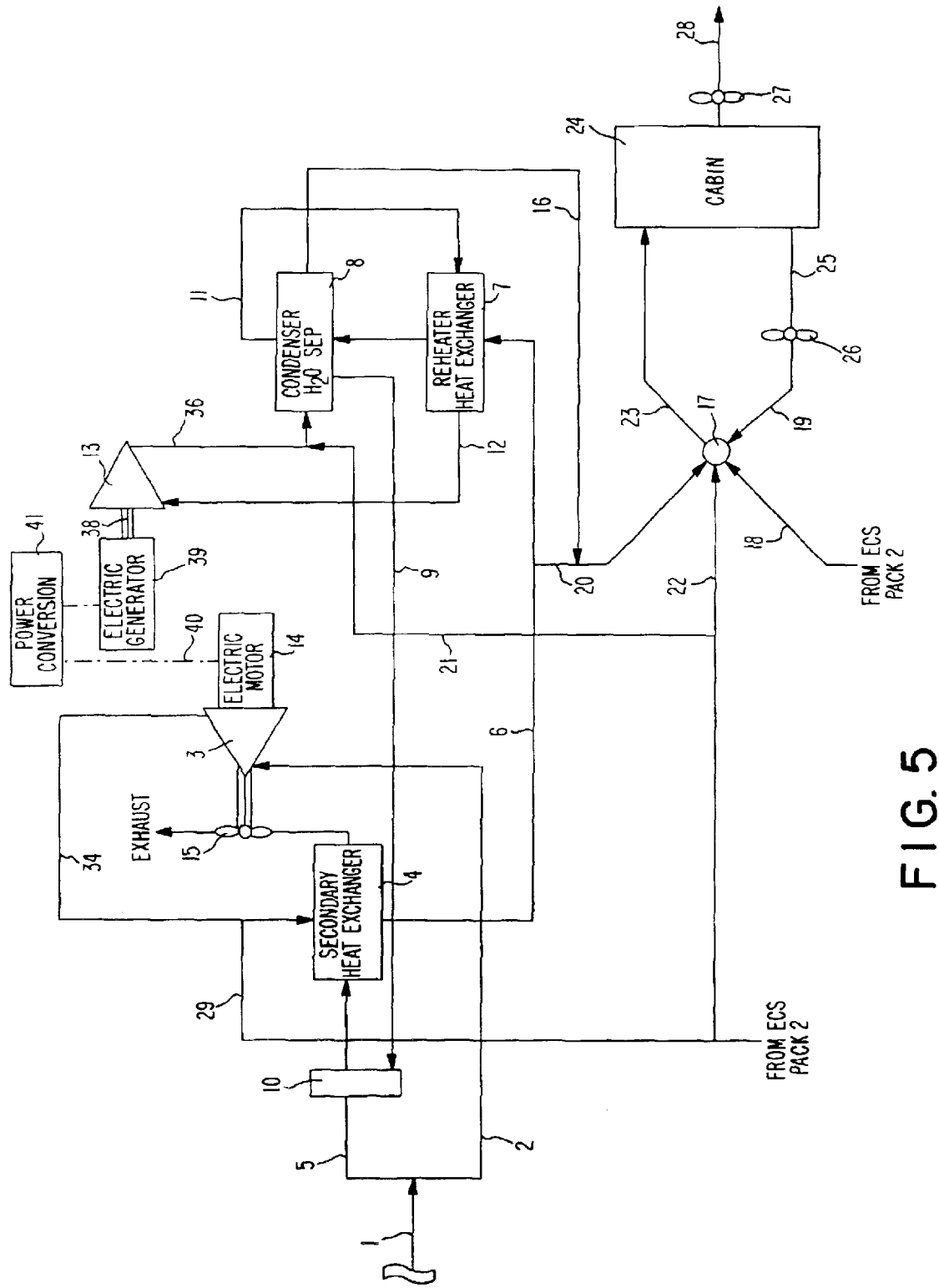
FIG. 5 is a schematic representation of a fifth embodiment of an electrically driven aircraft cabin ventilation and environmental control system in accordance with the present invention.

FIG. 5 illustrates yet another embodiment of an electrically driven aircraft cabin ventilation and environmental control system in accordance with the present invention. In this embodiment, the ventilation compressor 3 and the air cycle subsystem are located on two independent shafts. One shaft would carry the ventilation compressor 3, the electric motor 14, and optionally the power turbine (not shown). Another shaft 38 would carry the cooling turbine 13, an electric generator 39, and a condensing turbine (not shown) if a condensing cycle is used. Energy flow (power) between the two subsystems would then be transmitted by an electric link 40 through power conversion hardware 41 associated with the motor 14 and generator 39. The primary power for the ventilation system compression and the ram air fan 15 is delivered by the electric motor 14. This power is supplemented by the shaft power developed in the cooling turbine 13, and if appropriate, the shaft power developed by the power turbine 33 and/or the condensing turbine. The electric ECS turbomachine incorporates the cooling turbine and/or power turbine, the electric motor, and/or generator, ventilation compressor and ram fan onto a single shaft, or onto two shafts. The motor and/or generator must operate at variable speed, therefore an inverter/motor drive and associated control functions will be required for each.

It is apparent that there has been provided an electrically driven aircraft cabin ventilation and environmental control system which fully satisfies the objects, means and advantages set forth hereinbefore. While the present invention has been described in the context of specific embodiments thereof, other alternatives, modifications, and variations will become apparent to those skilled in the art having read the foregoing description. Therefore, it is intended to embrace those alternatives, modifications, and variations which fall within the broad scope of the appended claims.

What is claimed is:

1. An electrically driven aircraft cabin ventilation and environmental control system comprising:
   means for capturing ram air;
   means for creating a first flow of said ram air and a second flow of said ram air;

electrically driven means for receiving said first flow of ram air and for creating a pressurized ram air flow;

first means for cooling said pressurized ram air flow, said first cooling means receiving said second ram air flow and using said second ram air flow as a heat sink;

second means for receiving said cooled pressurized ram air from said first cooling means and for cooling and removing moisture from said cooled pressurized ram air;

said second means including a reheater heat exchanger for cooling said cooled pressurized ram air received from said first cooling means and a condenser heat exchanger for condensing water vapor contained in said cooled pressurized ram air and for further cooling said cooled pressurized ram air;

liquid from said condensed water vapor being separated in said condenser heat exchanger and being supplied to a means for precooling said second ram air flow prior to its use as a heat sink;

said air exiting said condenser heat exchanger being delivered to an opposite side of said reheater heat exchanger to be warmed;

expansion means for receiving said cooled ram air from said opposite side of said reheater heat exchanger and for expanding said cooled ram air; and means for delivering said cooled pressurized air from said expansion means to said cabin, said delivering means comprising means for passing air exiting said expansion means through said condenser heat exchanger prior to delivering said air to said cabin.

2. A system according to claim 1, wherein said electrically driven means comprises a ventilation compressor driven by an electric motor, and wherein said compressor and said motor are mounted to a common shaft.

3. An electrically driven aircraft cabin ventilation and environmental control system comprising:

means for capturing ram air;

means for creating a first flow of said ram air and a second flow of said ram air;

electrically driven means for receiving said first flow of ram air and for creating a pressurized ram air flow;

first means for cooling said pressurized ram air flow, said first cooling means receiving said second ram air flow and using said second ram air flow as a heat sink;

second means for receiving said cooled pressurized ram air from said first cooling means and for cooling and removing moisture from said cooled pressurized ram air;

expansion means for receiving said cooled ram air from said second means and for expanding said cooled ram air;

means for delivering said cooled pressurized air from said expansion means to said cabin;

means for passing air exiting said expansion means through a condenser heat exchanger prior to delivering said air to said cabin; and means for delivering said cooled pressurized air from said expansion means to said cabin; and means for precooling said second ram air flow prior to said second ram air flow being delivered to said first cooling means.

4. A system according to claim 1, wherein said expansion means comprises a cooling turbine to reduce the pressure and temperature of the warmed air exiting said reheater heat exchanger.

5. A system according to claim 4, further comprising means for mixing engine bypass air with air exiting said cooling turbine.

6. A system according to claim 4, wherein said electrically driven means, an electric motor for driving said electrically driven means, and said cooling turbine are mounted on a common shaft.

7. A system according to claim 4, wherein said electrically driven means and an electric motor for driving the electrically driven means are mounted on a first shaft and said cooling turbine is mounted on a second shaft separate from said first shaft.

8. A system according to claim 7, further comprising an electrical generator mounted to said second shaft and a power conversion unit connecting said electrical generator and said electrical motor.

9. A system according to claim 1, wherein said delivering means comprises a mix manifold for receiving an exit air stream from said expansion means and for delivering air to said cabin.

10. A system according to claim 9, wherein said mix manifold receives at least one of recirculated air from said cabin, a portion of said pressurized ram air prior to said compressed air entering said first cooling means, and hot gas bypass air from an engine.

11. A system according to claim 10, further comprising means for exhausting a portion of cabin exhaust air to ambient.

12. A system according to claim 10, further comprising a recovery heat exchanger for receiving said air exiting said electrically driven means and means for delivering cabin exhaust air to said recovery heat exchanger to act as a heat sink.

13. An electrically driven aircraft cabin ventilation and environmental control system comprising: means for capturing ram air; means for creating a first flow of said ram air and a second flow of said ram air; electrically driven means for receiving said first flow of ram air and for creating a pressurized ram air flow; first means for cooling said pressurized ram air flow, said first cooling means receiving said second ram air flow and using said second ram air flow as a heat sink; second means for receiving said cooled pressurized ram air from said first cooling means and for cooling and removing moisture from said cooled pressurized ram air; said second means including a reheater heat exchanger for cooling said cooled pressurized ram air from said first cooling means and a condenser heat exchanger for condensing water vapor contained in said cooled pressurized ram air and for further cooling said cooled pressurized ram air; liquid from said condensed water vapor being separated in said condenser heat exchanger and being used to cool said second ram air flow prior to its use as a heat sink; said air exiting said condenser heat exchanger being delivered to an opposite side of said reheater heat exchanger to be warmed; expansion means for receiving said cooled ram air from said opposite side of said reheater heat exchanger and for expanding said cooled ram air; means for delivering said cooled pressurized air from said expansion means to said cabin, said delivering means comprising means for passing air exiting said expansion means through said condenser heat exchanger prior to delivering said air to said cabin and a mix manifold for receiving an exit air stream from said expansion means and for delivering air to said cabin; said mix manifold receiving at least one of recirculated air from said cabin, a portion of said pressurized ram air prior to said compressed air entering said first cooling means, and hot gas bypass air from an engine; a recovery heat exchanger for receiving said air exiting said electrically driven means and means for delivering cabin exhaust air to said recover heat exchanger to act as a heat sink; and said electrically driven means, an electric motor for driving said electrically driven means and a condensing turbine being mounted to a common shaft, said second cooling means including a condenser heat exchanger, and said condensing turbine receiving cool dehumidified air exiting said condenser heat exchanger and further expanding the air so that said air exits said condensing turbine close to a desired cabin pressure level.

14. An electrically driven aircraft cabin ventilation and environmental control system comprising:

means for capturing ram air;
means for creating a first flow of said ram air and a second flow of said ram air;
electrically driven means for receiving said first flow of ram air and for creating a pressurized ram air flow;
first means for cooling said pressurized ram air flow, said first cooling means receiving said second ram air flow and using said second ram air flow as a heat sink;
second means for receiving said cooled pressurized ram air from said first cooling means and for cooling and removing moisture from said cooled pressurized ram air;
expansion means for receiving said cooled ram air from said second means and for expanding said cooled ram air;
means for delivering said cooled pressurized air from said expansion means to said cabin; and
means for removing a portion of the pressurized air exiting said electrically driven means upstream of said first cooling means to provide temperature modulation in an air cycle subsystem and air distribution system.

15. An electrically driven aircraft cabin ventilation and environmental control system comprising:

means for capturing ram air;
means for creating a first flow of said ram air and a second flow of said ram air;
electrically driven means for receiving said first flow of ram air and for creating a pressurized ram air flow;
first means for cooling said pressurized ram air flow, said first cooling means receiving said second ram air flow and using said second ram air flow as a heat sink;
second means for receiving said cooled pressurized ram air from said first cooling means and for cooling and removing moisture from said cooled pressurized ram air;
expansion means for receiving said cooled ram air from said second means and for expanding said cooled ram air;
means for delivering said cooled pressurized air from said expansion means to said cabin; and
a spray cooler means for cooling said second ram air flow prior to delivering said second ram air flow to said first cooling means and means for delivering water to said spray cooler from said second cooling means.

16. A method for delivering conditioned air to an aircraft cabin comprising the steps of:

capturing ram air;
creating a first flow of ram air and a second flow of ram air from said captured ram air;
delivering said first flow of ram air to an electrically driven compressor and pressurizing said ram air in said compressor;
providing first means for cooling said pressurized ram air;
delivering said second ram air flow to said first cooling means and using said second ram air flow as a heat sink;
providing second means for cooling said pressurized ram air and for removing moisture from said pressurized ram air;
delivering said cooled pressurized ram air from said first cooling means to said second cooling means;
removing moisture from said cooled pressurized ram air in said second means by condensing said moisture out of said cooled pressurized ram air and separating a liquid formed by said condensed moisture;
cooling said second flow of ram air with said separated liquid prior to its delivery to said first cooling means;
providing expansion means and delivering said cooled ram air from said second cooling and moisture removing means to an inlet of said expansion means; and
delivering said cooled pressurized air from an outlet of said expansion means to said cabin.

17. A method according to claim 16, wherein said second cooling and moisture removing means providing step comprises providing a reheater heat exchanger and a condenser and said step of delivering said cooled ram air from said first cooling means comprises cooling said ram air by passing said ram air through said reheater heat exchanger and said condenser.

18. A method according to claim 17, further comprising warming said air exiting said condenser by passing said air through said reheater heat exchanger.

19. A method according to claim 18, wherein said expansion means comprises a cooling turbine and wherein said method further comprises introducing said warmed air exiting said reheater heat exchanger into an inlet of said cooling turbine, and expanding said air introduced into said cooling turbine inlet.

20. A method according to claim 19, wherein said delivering step comprises introducing said expanded air exiting said cooling turbine into said condenser and delivering said expanded air in a cooled condition to a cabin air distribution system mix manifold.

21. A method according to claim 20, further comprising providing a condenser turbine and passing said air stream exiting said condenser through said condense turbine prior to said delivering step.

22. A method according to claim 19, further comprising mounting said compressor and an electric motor for driving said compressor on a first shaft, mounting said cooling turbine and an electric generator on a second shaft separate from said first shaft, and transmitting energy flow by providing an electric link between said electric motor and said electric generator.

23. A system according to claim 3, wherein said expansion means expands said air so that said air exiting said expansion means is close to a desired cabin pressure level.

24. A system according to claim 14, wherein said expansion means expands said air so that said air exiting said expansion means is close to a desired cabin pressure level.

25. A system according to claim 15, wherein said expansion means expands said air so that said air exiting said expansion means is close to a desired cabin pressure level.

26. A method according to claim 16, further comprising expanding said air in said expansion means so that said air exiting said expansion means is close to a desired cabin pressure level.

* * * * *

UNITED STATES PATENT AND TRADEMARK OFFICE
CERTIFICATE OF CORRECTION

PATENT NO. : 6,928,832 B2 Page 1 of 1
APPLICATION NO. : 10/672651
DATED : August 16, 2005
INVENTOR(S) : Charles E. Lents et al.

It is certified that error appears in the above-identified patent and that said Letters Patent is hereby corrected as shown below:

On the Title Page, Item -73-
The assignee listed on the patent "Hamilton Sunstrand Corporation" should be corrected to read --Hamilton Sundstrand Corporation--.

Signed and Sealed this

Twenty-seventh Day of May, 2008

JON W. DUDAS
*Director of the United States Patent and Trademark Office*